March 14, 1961 A. SMITH ET AL 2,974,735
EARTH BANKING APPARATUS
Filed Jan. 27, 1960 2 Sheets-Sheet 1

INVENTORS
ALEXANDER SMITH and
B.D. BAGGS, JR.

BY
ATTORNEY

March 14, 1961     A. SMITH ET AL     2,974,735
EARTH BANKING APPARATUS

Filed Jan. 27, 1960     2 Sheets-Sheet 2

INVENTORS
ALEXANDER SMITH and
B.D. BAGGS, JR.

BY
ATTORNEY

United States Patent Office 2,974,735
Patented Mar. 14, 1961

2,974,735
EARTH BANKING APPARATUS

Alexander Smith and Burton D. Baggs, Jr., Sanford, Fla., assignors to B & S Manufacturing Co., Sanford, Fla., a corporation of Florida Filed Jan. 27, 1960, Ser. No. 5,061

6 Claims. (Cl. 172—108)

This invention relates to the care and cultivation of plant life including small trees in orchards, groves and the like, and to the equipment employed including that for providing a bank of earth around and in contact with young trees and other plants for protecting the same during cold weather.

The invention relates specifically to the mounting on a tractor of apparatus including a rotary digger and driving means therefor for producing the bank around the trees and other plants.

Work around young trees and other plants and particularly the banking of the earth or the creation of a ridge or the excavation of a channel has been done by hand labor with spades and shovels and consequently has been slow and expensive and as a result attempts have been made to build mechanical bankers and the like equipment but these devices have been expensive, complicated, difficult to install and remove and to operate and have required special installation since they did not fit conventional equipment and their operation has been limited to areas in which the soil was relatively clean of vegetation and free of foreign matter.

It is an object of the invention to provide apparatus or equipment of simple construction including a three point hitch mounting and a telescopic drive connection which will fit the hydraulic hitch of modern farm tractors, can be readily installed or removed, which is easy to operate and maintain and in conjunction with which apparatus can be added for providing a bank around a plant, or for providing a ridge or channel in spaced relation to such plant.

Another object of the invention is to provide apparatus of few working parts, easy to operate and maintain at small cost and with minimum effort, as well as a device applicable to a tractor in which the operating mechanism is in line with the rear axle extended whereby it can operate in a minimum radius for encircling trees, and which device can be moved between a lower operative position to an elevated traveling position, and in which minimum damage will be caused to small trees and plants and the amount of soil around the same and by which the depth or height of a ridge can be readily controlled.

Figure 1:
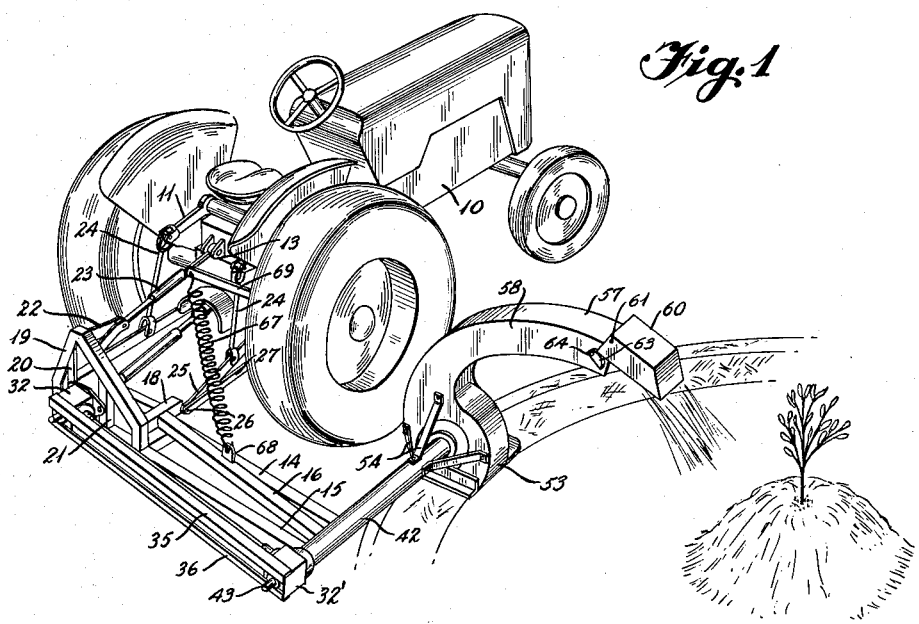
Figure 2:
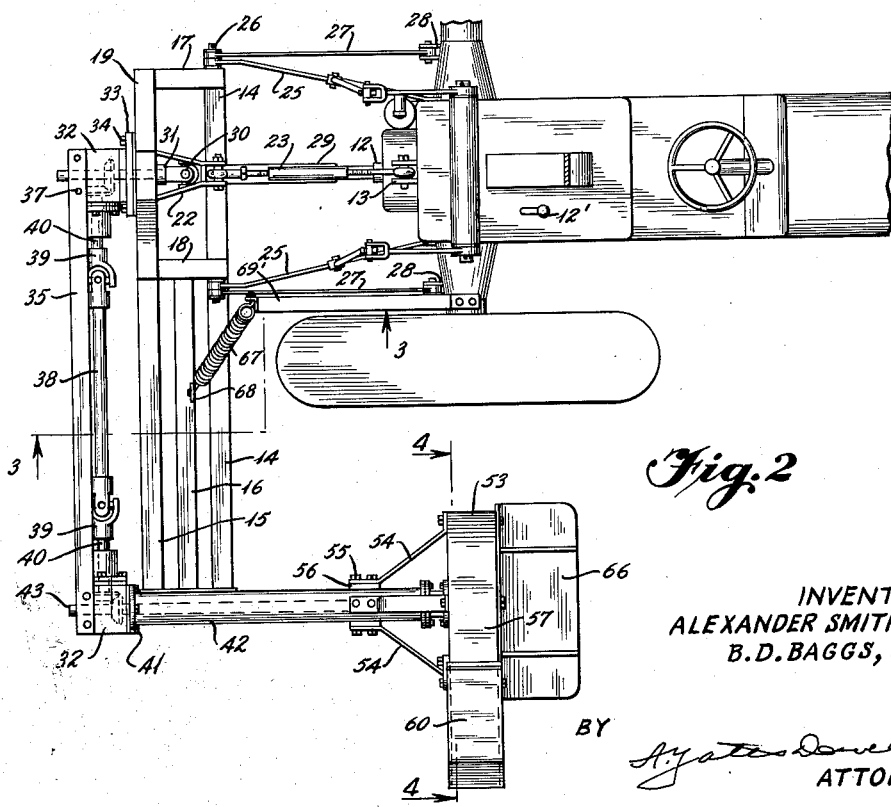
Figure 3:
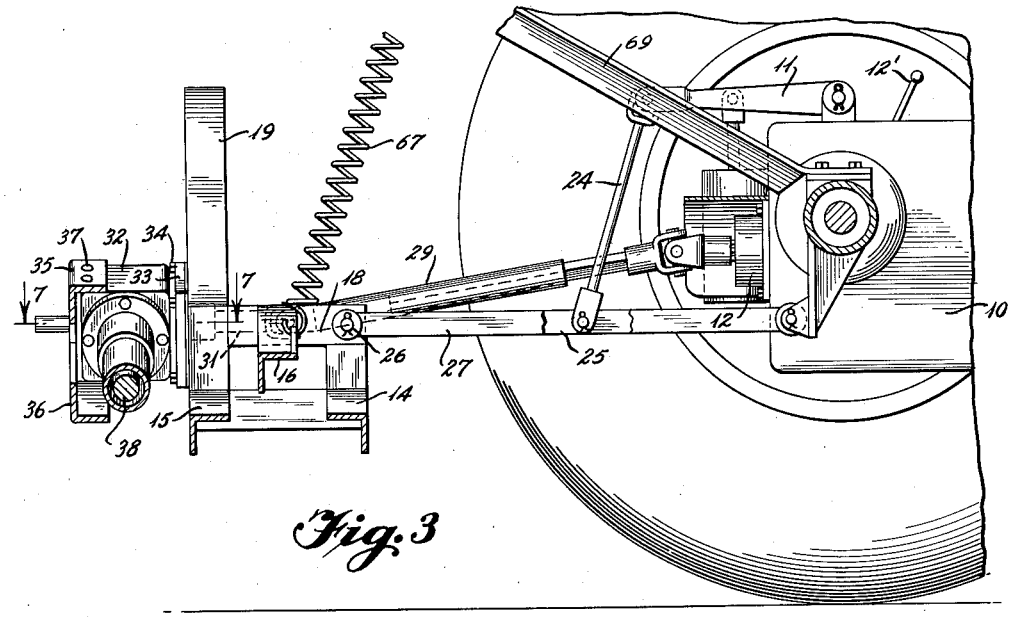
Figures 4, 5:
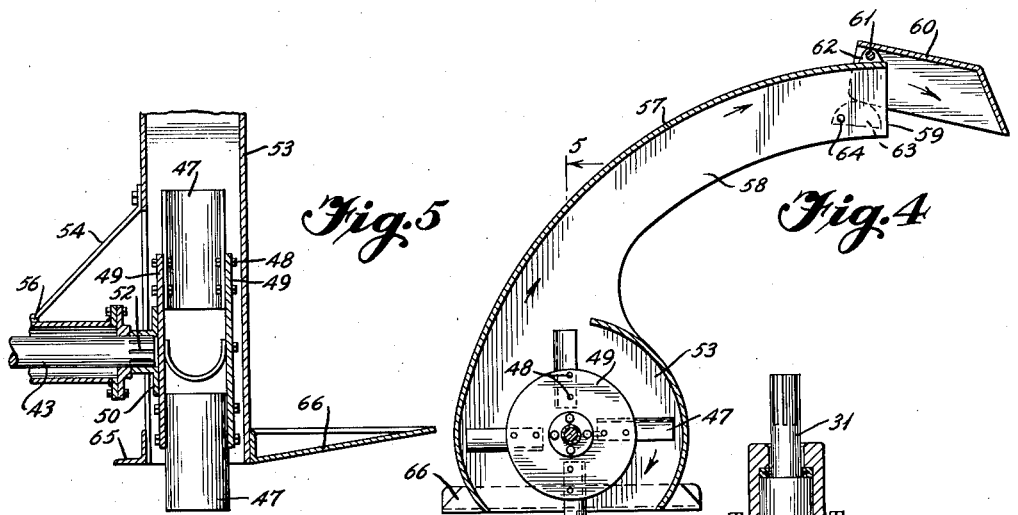
Figures 6, 7:
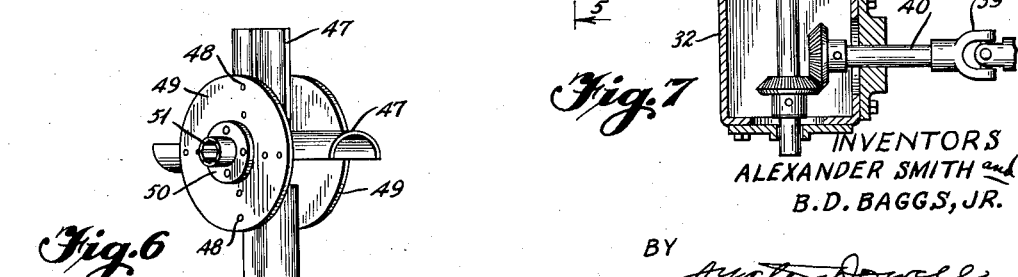

Other objects and advantages of the invention will be apparent from the following description taken in conjunction with the accompanying drawings wherein:

Fig. 1 is a perspective illustrating the application and use of the invention in connection with a conventional tractor;

Fig. 2, a top plan view;

Fig. 3, an enlarged fragmentary sectional detail on the line 3—3 of Fig. 2;

Fig. 4, a section on the line 4—4 of Fig. 2;

Fig. 5, an enlarged section on the line 5—5 of Fig. 4;

Fig. 6, a perspective of the earth moving portion of the device;

Fig. 7, a horizontal section on the line 7—7 of Fig. 3.

Briefly, stated, the invention is a three point hitch mounting for a conventional tractor with a telescopic drive connection to the power takeoff of the tractor. Such mounting can be raised or lowered to variable operable positions and to an inoperative elevation for transportation, and on which mounting, apparatus can be attached for depositing earth in a bank around small trees or plants or to create a ridge or channel in spaced relation thereto but with the operative apparatus located similarly in line with the rear axle of the tractor extended to enable the tractor to travel in a circle of minimum radius about small trees or plants. The device comprises generally a transversely disposed frame with a triangular portion behind the tractor and with a lateral extension frame having a gear box located centrally behind the tractor and a second gear box at the side thereof and with a shaft and housing extending forwardly from such second gear box and beyond the outer side of the wheel of the tractor for carrying the operating mechanism in line with the axle of the tractor.

With continued reference to the drawings, the invention is adapted to be applied to a conventional tractor 10 having spaced hydraulically operated lift arms 11, a power takeoff 12 controlled by a suitable clutch mechanism (not shown) and a control lever 12', and a bracket 13.

Power operated equipment is adapted to be mounted on and driven by the tractor, such power equipment being located in the line of the rear axle of the tractor extended to permit the tractor to travel in a circle of minimum radius.

In order to support the power equipment, a mounting is provided including a series of transverse substantially horizontal bars 14, 15 and 16, the spaced bars 14 and 15 being connected by relatively short longitudinal bars 17 and 18 and with a generally inverted V-shaped frame 19 and a pair of upright braces 20 and 21 mounted on the bar 15.

A bracket 22 is attached to the upper portion of the inverted V-shaped frame 19 and located between this bracket and the bracket 13 of the tractor is an extensible turnbuckle connection 23. Also depending from each of the lift arms 11 is a link 24 pivoted to a mounting bar 25 having one end attached by a pivot bolt 26 to the forward end of one of the bars 17 and 18. A stabilizer bar 27 likewise has one end mounted on said pivot bolt 26 with its other end connected by a bracket 28 with the axle housing of the tractor. Thus when the lift arms 11 of the tractor are raised and lowered, the mounting frame and attached equipment likewise will be raised and lowered.

From the power takeoff 12 a telescopic connection 29 extends to a universal joint 30 and a shaft 31 with a gear box 32 having a plate 33 attached by bolts 34 to the upright braces 20 and 21 of the mounting frame. A second gear box 32' is disposed outwardly beyond the side of the tractor and is braced in such fixed relation by means of angular upper and lower braces 35 and 36 secured by bolts or other fastening means 37 to the gear boxes. Between the two spaced gear boxes 32 and 32' is mounted a connecting shaft 38 having a universal joint 39 at each end connected by a stub shaft 40 with the gear box 32'. Thus the drive from the power takeoff will extend to the gear box 32' at the side of the vehicle.

Attached to the front face of the laterally disposed gear box 32' by means of additional bolts 41 is a shaft housing 42 in which is carried a shaft 43 and forming a continuation of the drive from the power takeoff. The housing 42 is secured by welds to the ends of the bars 14, 15 and 16 at the side of the tractor and thus supported by them so that when the mounting frame is raised and lowered the housing 42 and shaft 43 encased therein likewise will be raised and lowered.

From the outer end of the shaft 43 there may be driven a power operated unit in the form of a banking device. The banking device comprises a rotary digger composed of semi-circular scoops 47 of which there may be any desired number, four being illustrated spaced 90 degrees apart, and such scoops are secured by fasteners 48 between spaced disks 49 to which a flange 50 is attached having a splined socket 51 for cooperative engagement with a spline 52 on the end of the shaft 43. Thus the digger unit will be driven from the power takeoff of the tractor.

The digger unit is provided with a housing 53 mounted by means of brackets 54 connected by bolts or other fasteners 55 to projections or lugs 56 on the shaft housing 42, any number of such brackets may be employed with four equally spaced brackets being illustrated.

The housing 53 extends upwardly and curves outwardly from the tractor to provide a deflector 57 with a pair of depending sides 58 so that when earth is forcibly thrown upwardly it may be variably deflected outwardly beyond the end 59 of the deflector. In order to direct the angularity or direction of the discharge a baffle 60 is mounted on a pivot 61 in a pair of lugs 62, a pivoted cam 63 being mounted on a pivot 64 and with such cam attached to one of the sides 58 of the deflector and adapted to engage the baffle 60 to regulate the angularity of such baffle so that the earth may be discharged at the desired angle either for banking or for producing a ridge, the earth removed by the digger element leaving a trench.

On the outside of the housing 53 are mounted depth restricting flanges 65 and 66, the flange 66 being substantially wider than the flange 65 and inclined slightly upward to override small obstructions and to prevent excessive earth engagement.

In order to assist in supporting the power unit a coil spring 67 may be provided having one end attached to a perforated lug 68 on the bar 16 and its other end mounted in an opening in the housing arm 69 carried by the tractor, the spring serving to resiliently assist in the supporting of the mounting frame.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A steerable tractor having a small turning radius, a power takeoff and at least one support wheel having a wheel axis extending transversely to the direction of travel, a bank forming implement, support means carried by said tractor mounting said bank forming implement laterally of said tractor and substantially in transverse alignment with said wheel axis, said bank forming implement being comprised of a longitudinally extending rotatable shaft, means drivingly connecting said shaft to said power takeoff, at least one earth engaging scoop mounted on said shaft for rotation therewith for cutting and projecting earth, and earth transmitting and deflecting means mounted on said implement for directing the projected earth laterally outwardly from said tractor and implement substantially in transverse alignment with said wheel axis whereby said tractor may encircle a particular spot and form a bank within said small turning radius of the tractor.

2. The invention according to claim 1 in which said support means includes a mounting frame having a portion extending transversely of said tractor and a portion extending along the direction of travel of said tractor, said bank forming implement being mounted on said portion of said mounting frame extending along the direction of travel, said driving connection being carried by said mounting frame and adapted to drive said rotatable shaft, and a telescopic power receiving shaft connecting the power takeoff of the tractor and said driving connection carried by said mounting frame.

3. Apparatus according to claim 1 in which said support means includes a mounting frame extending transversely of the tractor, a support carried by said mounting frame laterally of the tractor in a position to support said bank forming implement and to allow encircling a particular spot within said small turning radius, and shaft means connecting said power takeoff to said bank forming implement for driving the latter.

4. The invention according to claim 1 in which said bank forming implement includes at least one substantially semi-cylindrical scoop, a housing for said scoop having an opening through which said scoop extends downwardly for engagement with the earth, an earth engaging depth restricting flange mounted on said housing on which said housing is adapted to ride, a second opening in said housing through which the projected earth may be discharged in a concentrated area, an adjustable deflecting portion mounted adjacent said discharge opening, said means for driving said scoop operating at a sufficiently high rate of speed to cause it to pick up and project earth at a high velocity through said housing subject to the effect of said adjustable deflecting portion.

5. The invention according to claim 1 in which multiple scoops are arranged to provide a rotary digger, a housing about said rotary digger having an open lower portion below which said scoops extend for engaging the earth, said housing having an upwardly and outwardly disposed portion with a discharge opening through which the earth may be discharged, and a member adjustably mounted on the discharge end of the housing to vary the angle of the discharge.

6. A bank forming implement for attachment to a tractor having a small turning radius, a power takeoff and a wheel supported rear axle extending transversely to its direction of travel, said bank forming implement comprising support means and earth moving means, said support means being constructed and arranged to attach the earth moving means laterally of the tractor and substantially in transverse alignment with the axle of the tractor, said earth moving means being comprised of a rotatable shaft generally parallel to the direction of travel of the tractor and arranged to be driven from the power take-off thereof, scoop means carried by said shaft for rotation therewith for cutting and projecting earth, and earth transmitting and deflecting means mounted on said earth moving means for directing the projected earth laterally outwardly from the tractor substantially in transverse alignment with said axle thereby to form a bank within the small turning radius of the tractor upon the tractor encircling a particular spot.

References Cited in the file of this patent

UNITED STATES PATENTS

| 1,011,259 | Smith et al. | Dec. 12, 1911 |
| 1,407,947 | Pagel | Feb. 28, 1922 |
| 1,567,627 | Stanton | Dec. 29, 1925 |
| 1,879,315 | Klauer et al. | Sept. 27, 1932 |
| 2,173,771 | Taylor | Sept. 19, 1939 |
| 2,330,586 | Hurlimann | Sept. 28, 1943 |
| 2,335,510 | Hansen | Nov. 30, 1943 |
| 2,665,621 | Smith et al. | Jan. 12, 1954 |
| 2,685,751 | Bain | Aug. 10, 1954 |
| 2,761,366 | Jones | Sept. 4, 1956 |
| 2,763,072 | Inhofer | Sept. 18, 1956 |
| 2,766,835 | Witt | Oct. 16, 1956 |
| 2,777,272 | Smith et al. | Jan. 15, 1957 |
| 2,840,937 | Clarke | July 1, 1958 |
| 2,885,800 | Hawkins | May 12, 1959 |
| 2,909,855 | Kolbe | Oct. 27, 1959 |

FOREIGN PATENTS

| 198,297 | Austria | June 25, 1958 |